United States Patent
Hirano

(10) Patent No.: US 12,151,735 B2
(45) Date of Patent: Nov. 26, 2024

(54) STEERING WHEEL DEVICE FOR VEHICLE

(71) Applicants: Autoliv Development AB, Vargarda (SE); Daimu Hirano, Kanagawa (JP)

(72) Inventor: Daimu Hirano, Kanagawa (JP)

(73) Assignee: Autoliv Development AB, Vårgårda (SE)

(\*) Notice: Subject to any disclaimer, the term of this patent is extended or adjusted under 35 U.S.C. 154(b) by 0 days.

(21) Appl. No.: 18/002,606

(22) PCT Filed: May 17, 2021

(86) PCT No.: PCT/JP2021/018555
§ 371 (c)(1),
(2) Date: Dec. 20, 2022

(87) PCT Pub. No.: WO2021/261110
PCT Pub. Date: Dec. 30, 2021

(65) Prior Publication Data
US 2023/0234631 A1 Jul. 27, 2023

(30) Foreign Application Priority Data
Jun. 24, 2020 (JP) .................. 2020-109181

(51) Int. Cl.
*B62D 1/10* (2006.01)
*B60R 16/02* (2006.01)
*B60R 21/203* (2006.01)

(52) U.S. Cl.
CPC ............ *B62D 1/10* (2013.01); *B60R 16/0215* (2013.01); *B60R 21/203* (2013.01);
(Continued)

(58) Field of Classification Search
CPC ..... B62D 1/10; B60R 16/0215; B60R 21/203; B60Y 2400/83; B60Y 2410/10; B60Y 2410/115
(Continued)

(56) References Cited

U.S. PATENT DOCUMENTS 5,794,969 A * 8/1998 Sakane ................ B60R 21/203
                                                    280/728.2
7,549,673 B2 * 6/2009 Suzuki .................... B60R 21/26
                                                      280/736
(Continued)

FOREIGN PATENT DOCUMENTS

CN          205890967 U       1/2017
CN          206691177 U      12/2017
(Continued)

*Primary Examiner* — Toan C To
(74) *Attorney, Agent, or Firm* — Matthew D. Thayne; Thayne and Davis LLC

(57) ABSTRACT

A vehicle steering wheel device, including a center portion of a steering wheel, a steering wheel cover that covers the center portion on the dashboard side, the side opposite the driver, an electronic control unit stowed in an internal area between the steering wheel cover and the center portion, an opening section where a part of the steering wheel cover is open in a window shape, a lid detachably provided on the steering wheel cover that closes the opening section, and a harness provided in the internal space that connects to the electronic control unit and supplies power from the vehicle body side, where the electronic control unit is provided secured to the lid, and the lid is connected to the vehicle body side by the harness connected to the electronic control unit.

5 Claims, 4 Drawing Sheets

(52) U.S. Cl.
CPC ....... *B60Y 2400/83* (2013.01); *B60Y 2410/10* (2013.01); *B60Y 2410/115* (2013.01)

(58) Field of Classification Search
USPC .......................................... 280/731
See application file for complete search history.

(56) References Cited

U.S. PATENT DOCUMENTS

| | | | |
|---|---|---|---|
| 10,272,869 B2* | 4/2019 | Kanto | B60Q 1/0082 |
| 11,383,639 B1* | 7/2022 | Kwon | B60Q 3/64 |
| 11,745,689 B1* | 9/2023 | Kutchey | B60R 21/21656 |
| | | | 280/728.3 |
| 2020/0398782 A1* | 12/2020 | Mills | B60R 21/2035 |
| 2021/0362668 A1* | 11/2021 | Park | B60R 21/21656 |

FOREIGN PATENT DOCUMENTS

| | | |
|---|---|---|
| JP | 54-105432 U1 | 7/1979 |
| JP | 2554159 Y2 | 11/1997 |
| JP | 10-64645 A | 3/1998 |
| JP | 2003-11745 A | 1/2003 |

* cited by examiner

STEERING WHEEL DEVICE FOR VEHICLE

TECHNICAL FIELD

The present invention relates to a vehicle steering wheel device that enables preventing the shattering of a lid for concealing an electronic control unit fixed somewhere on the steering wheel during operation of an airbag.

BACKGROUND ART

Patent Document 1 is known technology for incorporating an electronic control unit in a vehicle steering wheel device. With the "electronic control unit for a steering wheel device" of Patent Document 1, the steering wheel hub includes a first surface facing towards the back of the vehicle and a second surface facing the front of the vehicle. The electronic control unit includes a first surface facing the back of the vehicle. This first surface is provided between a second flat surface included on the second surface of the hub and the front of the vehicle, and a connector extends from the first surface of the electronic control unit toward the first surface of the hub.

RELATED ART DOCUMENTS

Patent Documents

Patent Document 1: U.S. Patent Application Publication No. 2019/0373728A1 Specification

SUMMARY OF THE INVENTION

Problem to be Solved by the Invention

Due to being heavy, the electronic control unit is conventionally connected to the steering shaft as in Patent Document 1, and secured to a boss section including the hub at the center of the steering wheel.

In conjunction with size reduction of the steering wheel, there is increased difficulty in ensuring sufficient space for installing an electronic control unit on the steering wheel. In this case, the electronic control unit needs to be secured and installed in another location around the steering wheel. The installed electronic control unit is concealed by a detachable lid for servicing.

Major damage is caused to the steering wheel when the airbag incorporated in the steering wheel operates during an emergency and this causes severe deformation to portions surrounding the steering wheel as well. If the lid of the electronic control unit is broken due to this deformation, there is additional likelihood of the lid shattering in the vehicle cabin and some form of countermeasure is desirable.

In light of the problem described above, an object of the present invention is to provide a vehicle steering wheel device that can prevent the shattering of the lid for concealing the electronic control unit fixed at some location on the steering wheel during operation of the airbag.

Means to Solve the Problem

A vehicle steering wheel device according to the present invention, includes:

a center portion including a boss section of the steering wheel in which an airbag module is incorporated facing a driver seat and the surrounding area thereof;

a steering wheel cover that covers the center portion on a dashboard side, a side opposite that of a driver;

an electronic control unit stowed in an internal area between a steering wheel cover and the center portion;

an opening section where a part of the steering wheel cover is open in a window shape;

a lid detachably provided on the steering wheel cover that closes the opening section; and a harness provided in the internal area that is connected to an electronic control unit and supplies power from a vehicle body side; wherein the electronic control unit is provided secured to the lid, and the lid is connected to the vehicle body side by the harness that connects to the electronic control unit.

The harness is preferably secured to the center portion of the steering wheel.

Effect of the Invention

With the vehicle steering wheel device according to the present invention, the shattering of a lid for concealing an electronic control unit fixed at some location on the steering wheel during operation of an airbag can be prevented.

DESCRIPTION OF THE PREFERRED EMBODIMENTS

Figure 1:
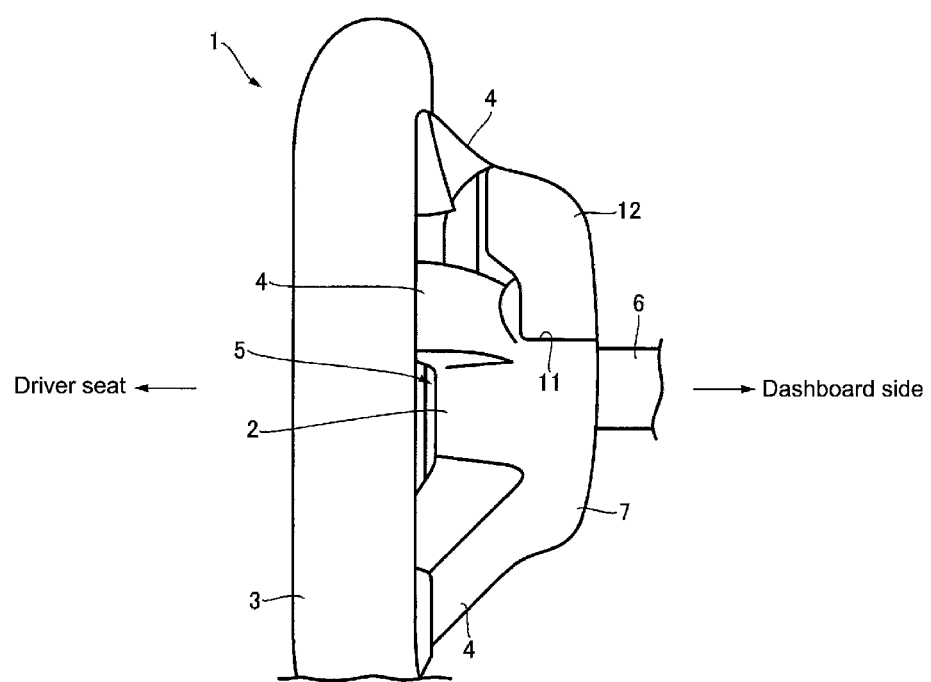
FIG. 1 is a cross-sectional view of the steering wheel and the surrounding area thereof illustrating a preferred embodiment of the vehicle steering wheel device according to the present invention.

A suitable embodiment of the vehicle steering wheel device according to the present invention is described in detail below with reference to the accompanying drawings. FIG. 1 illustrates a cross-sectional view of the steering wheel and surrounding area thereof of the vehicle steering wheel device according to the present embodiment.

A steering wheel 1 contains a metal cored bar member. The cored bar member is primarily composed of a center boss section 2, a ring shaped rim 3 for the driver to grip, and spokes 4 that connect the boss section 2 and the rim 3. A steering shaft (not illustrated) is connected to the boss section 2.

An airbag module (not illustrated) for the driver is assembled facing the driver seat at the vehicle rear side of a center portion 5 including the cored bar member of the boss section 2 and the vicinity or surrounding area (including the vicinity of the section connecting the spokes 4 and the boss section 2, depending on the shape of the steering wheel 1) of the boss section 2.

The airbag module is covered by a synthetic resin horn cover. The portion of the steering shaft protruding from the dashboard of the vehicle is covered by a synthetic resin shaft boot 6.

A shaft boot 6 is provided in the center portion 5 of the steering wheel 1. A synthetic resin steering wheel cover 7 is provided on the center portion 5 of the steering wheel 1 on the dashboard side, the side opposite that of the driver to hide the connecting section of the steering shaft and the steering wheel 1. The steering wheel cover 7 and the shaft boot 6 may be integrally molded.

An internal area S is formed in between the center portion 5 containing the boss section 2 of the steering wheel 1 and the surrounding area thereof and the steering wheel cover 7.

Figure 2:
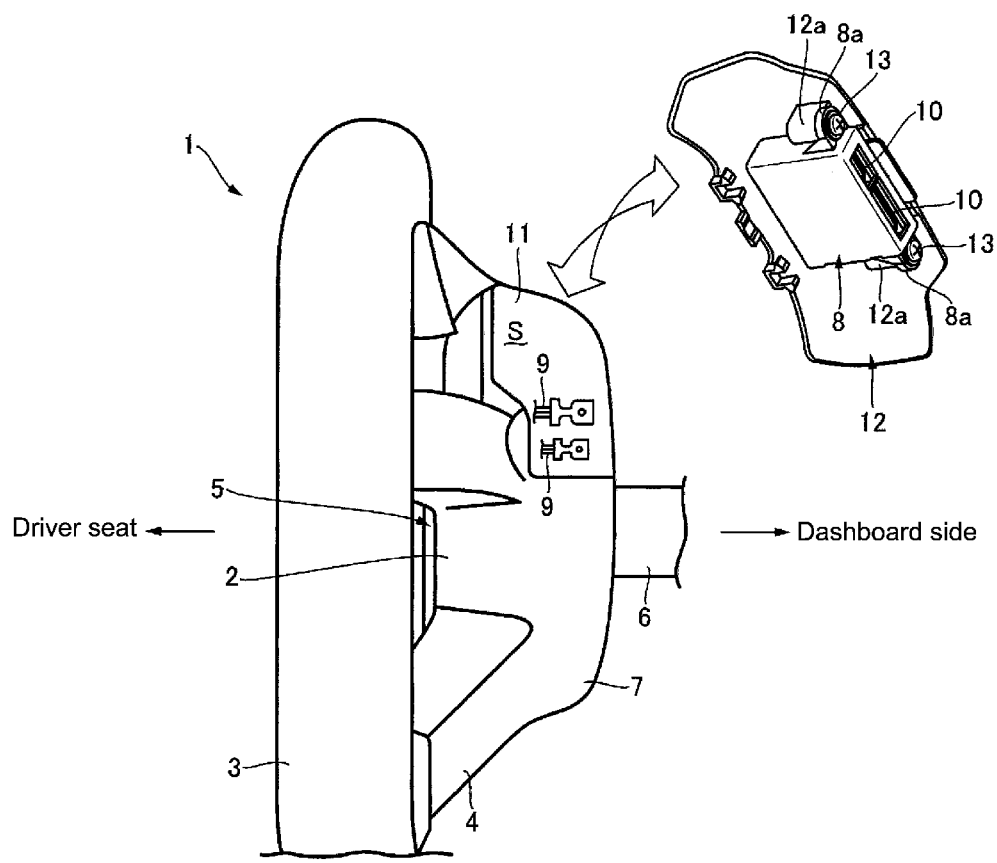
FIG. 2 is an explanatory diagram that describes the attach and detach operation of the lid on the steering wheel cover illustrated in FIG. 1.
Figure 3:
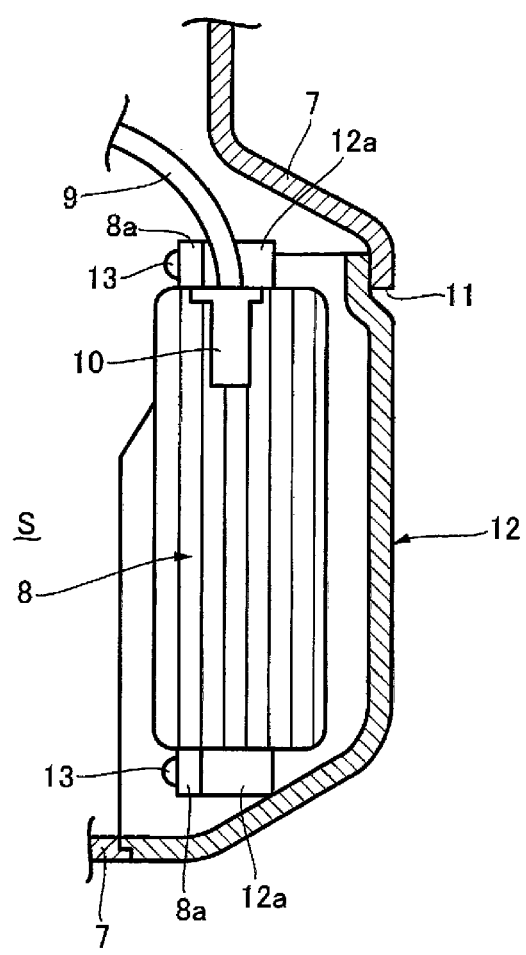
FIG. 3 is a cross-sectional view illustrating a state of the electronic control unit being stowed in the steering wheel cover illustrated in FIG. 1.
Figure 4:
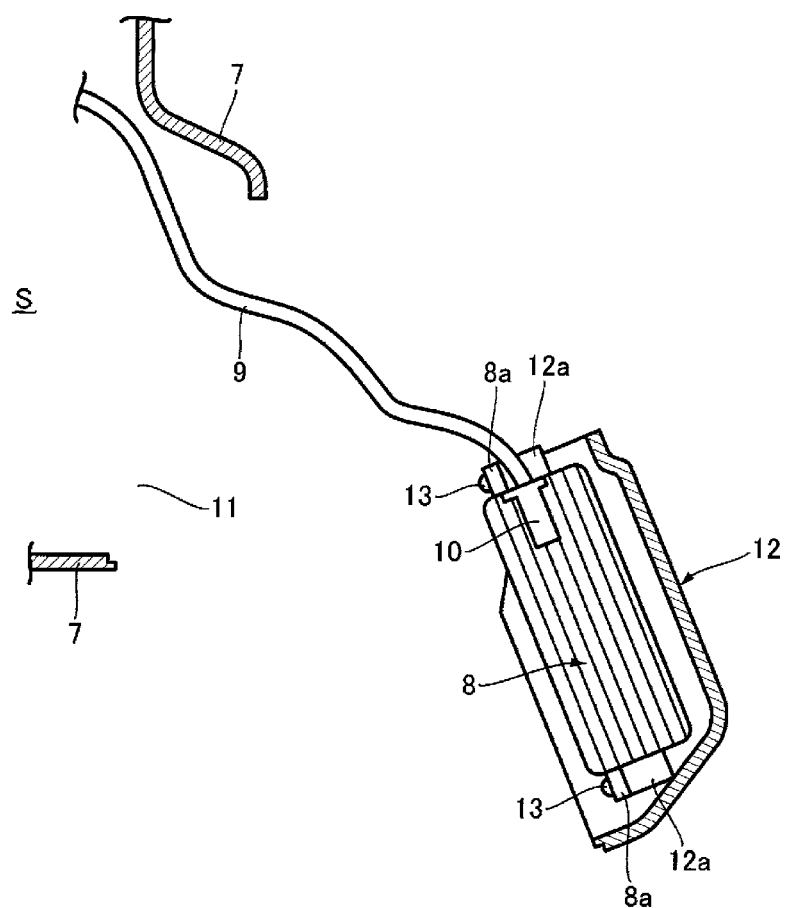
FIG. 4 is an explanatory diagram describing the effect of the vehicle steering wheel device illustrated in FIG. 1.

An electronic control unit 8 is stowed in the internal area S (in other words, inside the steering wheel cover 7) between the steering wheel cover 7 and the center portion 5 of the steering wheel 1, as illustrated in FIG. 2 and FIG. 3. A controller is integrated into the electronic control unit 8. The controller executes airbag operation and control corresponding to the operation of switches in the area surrounding the steering wheel 1. The controller may also include any additional control content.

The electronic control unit 8 is provided with a connector 10. A connector 10 connects with a harness 9 that is electrically connected to a battery mounted on the vehicle and supplies power.

A window like opening section 11 is formed in a part of the steering wheel cover 7. The opening section 11 provides access to the internal area S between the steering wheel cover 7 and the center portion 5 of the steering wheel 1.

A synthetic resin lid 12 for closing the opening section 11 is detachably provided on the steering wheel cover 7.

Various types of conventionally known snap structures can be utilized for attaching and detaching the lid 12 to the steering wheel cover 7. An example of a conventional snap structure is an engaging structure where an engaging tab formed on the lid 12 releasably engages with an engaging protrusion formed on the opening section 11, utilizing the elasticity of the lid 12. The lid 12 closes off the internal area S from the outside.

The harness 9 that connects to the connector 10 of the electronic control unit 8 is routed in the internal area S. The harness 9 supplies power from the vehicle body side battery to the electronic control unit 8. The electronic control unit 8 is provided secured to the lid 12.

In the present embodiment, a pair of brackets 8a are formed on the box shaped electronic control unit 8 protruding from the left and right side surfaces thereof. A pair of protruding sections 12a that overlap with the brackets 8a are formed on the lid 12.

The brackets 8a and the protruding sections 12a are respectively integrally screwed together with a screw 13. Thus, the electronic control unit 8 is secured to the lid 12.

The electronic control unit 8 is connected to the harness 9. The harness 9 is secured to a suitable section of the steering wheel 1. In detail, the harness 9 is desirably secured to the center portion 5 of the steering wheel 1 so that large oscillatory movements are not caused by steering operation.

Therefore, the lid 12 on which the electronic control unit 8 is mounted is connected to the steering wheel 1 on the vehicle body side by the harness 9.

The harness 9 is secured by screwing a harness clip that retains the harness 9 into a hole formed in the center portion 5 of the steering wheel 1. Otherwise, various conventionally known configurations can be used for securing the harness 9.

The length dimension of the harness 9 from the secure position on the center portion 5 to the electronic control unit 8 is formed with sufficient length to provide ample flexibility. Therefore, the harness 9 can freely be connected to the electronic control unit 8 on the lid 12 when removed from the opening section 11.

Attaching the lid 12 on the steering wheel cover 7 causes the electronic control unit 8 to be installed in the internal area S and to be hidden from the outside by the lid 12 (see FIG. 1 and FIG. 3).

Operation of the vehicle steering wheel device according to the present embodiment will be described.

With regards to assembling the electronic control unit 8, the electronic control unit 8 is first secured to the lid 12 which is a separate body from the steering wheel cover 7.

Next, the harness 9 that is secured to the center portion 5 is drawn out from the internal area S, which is covered by the steering wheel cover 7, and the harness 9 is connected to the connector 10 of the electronic control unit 8.

Next, to close the opening section 11, the lid 12 is attached to the opening section 11 and thus, the lid 12 is attached to the steering wheel cover 7. This completes assembly of the electronic control unit 8.

In conjunction with assembly of the electronic control unit 8, the lid 12 is in a moored state, or connected, to the vehicle body side, specifically, the center portion 5 of the steering wheel 1, by the harness 9.

In an emergency, operation of the airbag assembled in the steering wheel 1 causes major damage to the steering wheel 1. This results in major deformation to the section surrounding the steering wheel 1 and a large deforming external force acts on the lid 12.

With the vehicle steering wheel device according to the present embodiment, the electronic control unit 8, which is heavy and rigid, is secured to the lid 12, and thereby the electronic control unit 8 resists the deforming external force that acts on the lid 12. Thus, the lid 12 breaking or being shattered in the vehicle cabin can be prevented.

From the perspective of covering the lid 12 with the electronic control unit 8 and preventing breaking, the outer dimensions of the electronic control unit 8 are preferably slightly smaller than the outer dimensions of the lid 12.

Even if the lid 12 separates from the steering wheel cover 7 and flies off from the steering wheel cover 7 with the electronic control unit 8, the harness 9 connected to the electronic control unit 8 can remain secured to the center portion 5 of, for example, the steering wheel 1 on the vehicle body side. Therefore, the lid 12 and electronic control unit 8 can be retained in a connected state to the vehicle body side.

As a result, flying of the lid 12 can be restricted to the area surrounding the steering wheel cover 7 and exposing the occupant to danger due to shattering of the lid 12 or the like can be prevented.

The harness 9 is secured to the center portion 5 of the steering wheel 1, thus preventing large oscillatory movements of the harness 9 due to the steering operation. Therefore, the harness 9 can be arranged in the internal area S with high stability.

The vehicle steering wheel device described above is a preferred example of the present invention, and other Embodiments can also be implemented or carried out by various methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

EXPLANATION OF CODES

1. Steering wheel
2. Boss part

5. Center portion of steering wheel
7. Steering wheel cover
8. Electronic control unit
9. Harness
11. Opening section
12. Lid
S. Internal area

The invention claimed is:

1. A vehicle steering wheel device, comprising:
   a center portion including a boss section of the steering wheel and configured to receive an airbag module facing a driver seat;
   a steering wheel cover that covers the center portion on a dashboard side, a side opposite that of a driver;
   an electronic control unit stowed in an internal area between the steering wheel cover and the center portion;
   an opening section where a portion of the steering wheel cover is open in a window shape, wherein the opening section provides access to the internal area between the steering wheel cover and the center portion of the steering wheel;
   a lid detachably provided on the steering wheel cover that closes the opening section; and
   a harness provided in the internal area that is connected to an electronic control unit and supplies power from a vehicle body side;
   wherein
   the electronic control unit is provided secured to the lid, and
   the lid is connected to the steering wheel by the harness that connects to the electronic control unit.

2. The vehicle steering wheel device according to claim 1, wherein the harness is secured to the center portion of the steering wheel.

3. The vehicle steering wheel device according to claim 1, wherein the harness is configured to retain the lid and the electronic control unit in a connected state to the steering wheel upon separation of the lid from the steering wheel cover.

4. The vehicle steering wheel device according to claim 1, wherein the electronic control unit is fixedly secured to the lid.

5. The vehicle steering wheel device according to claim 4, wherein the electronic control unit is secured to the lid via one or more screws.

* * * * *